(No Model.)

H. A. HARVEY.
SPRING WASHER.

No. 329,738. Patented Nov. 3, 1885.

Witnesses:
M. L. Adams.
R. C. Howes.

Inventor:
H. A. Harvey,
Per Edw. E. Lumb,
Atty.

UNITED STATES PATENT OFFICE.

HAYWARD A. HARVEY, OF ORANGE, NEW JERSEY.

SPRING-WASHER.

SPECIFICATION forming part of Letters Patent No. 329,738, dated November 3, 1885.

Application filed September 26, 1885. Serial No. 178,226. (No model.)

*To all whom it may concern:*

Be it known that I, HAYWARD A. HARVEY, of Orange, New Jersey, have invented a certain Improvement in Spring-Washers for Bolt-Nuts, of which the following is a specification.

This improvement relates to the well-known spring-washers which, being interposed between a nut and the object through which is inserted the bolt to which the nut is applied, and compressed by the screwing home of the nut, are made, by the expansive force thus stored up in them, to exert upon the nut a strong pressure, which tends to prevent the nut from being unscrewed by the jarring of the object to which the bolt and nut are applied. Washers of this class have heretofore been made in the form of single convolutions of helices by radially slitting one side of an annular washer and bending the slit ends laterally in opposite directions. The slit ends have also been bent laterally, respectively, in opposite directions, beyond the true helical plane, in order to have them form so-called "biting-points." Spring-washers have also been made from a straight bar by coiling it helically.

Either of these methods of manufacture may be employed in carrying out the present improvement, which consists of a spring-washer having the form of a single convolution of a helically-coiled quadrangular bar, and having a dishing shape, so that its sides, instead of being in a radial direction perpendicular to the axis of the helix, are inclined relatively thereto. By this improvement, after the washer has so far yielded to compression as to have acquired the shape of a hollow frustum of a cone it is capable of being further compressed, and being thereby more or less flattened. By compression a torsional stress is imposed upon the winding bar of which the washer is made. The compressed washer, therefore, in addition to the expansive force which it possesses by reason of its tendency to resume its original helical form, also has stored up in it a torsional force, resulting from its tendency to resume its original dishing shape. This torsional force greatly augments the frictional hold of the washer upon the surfaces of the objects between which it is interposed, and correspondingly increases its efficiency in preventing the nut from becoming loose.

Figure 1:
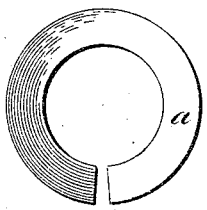
Figure 2:
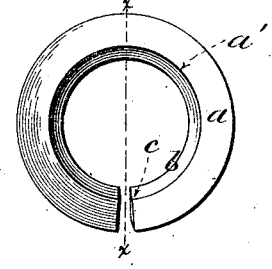
Figure 3:
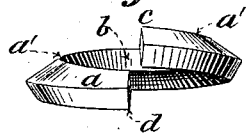
Figure 4:
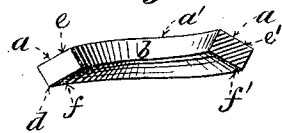

The accompanying drawings, illustrating the invention, are as follows:

Figure 1 is an end elevation of the ordinary spring-washer, which is not dished. Fig. 2 is an end elevation of a dished spring-washer. Fig. 3 is an isometrical perspective of the same, and Fig. 4 is a transverse section taken through the line $x$ $x$ on Fig. 2.

In a spring-washer of ordinary construction there is no dishing; hence in an end view of an ordinary spring-washer there is presented to the observer, as shown in Fig. 1, only one surface, $a$, of the helically-coiled quadrangular bar of which the washer is composed. In a similar end view of a dished washer there is presented to the observer, as shown in Fig. 2, not only the surface $a$, but also the inner or concave side, $b$, of the winding bar of which the washer is composed.

In use, the force by which the dished washer is compressed between the nut and the object through which the bolt is inserted is exerted on one side against the inner corner, $c$, at one end of the helically-coiled bar, and upon the other side against the outer corner, $d$, at the other end of the helically-coiled bar. There is thus imposed a torsional stress upon the winding bar. It will also be understood that when the washer has been so far compressed as to bring all parts of the inner edge, $a'$, of the surface $a$ to the same plane, and all parts of the outer edge of the opposite surface into a parallel plane, the compressed dished washer will have the shape of a hollow frustum of a cone, and that the tendency of further compression will be to flatten it. The dishing of the washer, therefore, increases its range of compressibility and resilience, and also increases the energy with which it tends to revert to its original form when released from pressure.

It is not absolutely essential that the dishing of the washer shall be perfectly symmetrical, or that it should necessarily extend from one end of the helically-coiled bar to the other.

Variation in the amount of dishing is shown in Fig. 4, in which, as will be seen, the end of the helically-coiled bar shown in elevation has its upper and lower edges, $e$ and $f$, less steeply inclined than the upper and lower edges, $e'$ and $f'$, of the part of the bar shown in section.

I claim as my invention—

A spring-washer for a bolt-nut, formed of a single convolution of a helically-coiled quadrangular bar, and having a dishing shape, substantially as and for the purposes set forth.

H. A. HARVEY.

Witnesses:
M. L. ADAMS,
R. C. HOWES.